United States Patent [19]
Kurz et al.

[11] Patent Number: 5,199,157
[45] Date of Patent: Apr. 6, 1993

[54] CONTINUOUS MANUFACTURE OF FORMED, PLATED COMPONENT PARTS HAVING SELECTED ALTERNATE CONFIGURATIONS

[75] Inventors: Arthur A. Kurz, New Vernon; Jeffrey McFadden, Cranford, both of N.J.

[73] Assignee: Adaptive Technology, Inc., New Vernon, N.J.

[21] Appl. No.: 822,967

[22] Filed: Jan. 21, 1992

[51] Int. Cl.$^5$ ............................................. B23P 17/00
[52] U.S. Cl. ................................. 29/527.4; 29/527.1; 29/527.2
[58] Field of Search ................. 29/527.4, 527.2, 527.1, 29/33 S, 33 Q; 226/118, 119

[56] References Cited

U.S. PATENT DOCUMENTS

| | | |
|---|---|---|
| 3,109,572 | 11/1963 | Heir .................................. 226/119 |
| 3,230,925 | 1/1966 | Blanz . |
| 3,305,914 | 2/1967 | Raue . |
| 3,571,899 | 3/1971 | Sobieski . |
| 3,696,503 | 10/1972 | Krengel et al. . |
| 3,734,370 | 5/1973 | Shumaker .......................... 226/119 |
| 3,834,009 | 9/1974 | Iida et al. . |
| 4,130,933 | 12/1978 | Demrick . |
| 4,356,946 | 11/1982 | Gaskell . |
| 4,358,887 | 11/1982 | Creps . |
| 4,469,572 | 9/1984 | Kimoto et al. . |
| 4,552,299 | 11/1985 | Sendzimir . |
| 4,567,630 | 2/1986 | Ishida et al. . |
| 4,711,009 | 12/1987 | Cornelison et al. . |
| 4,768,280 | 9/1988 | Palmer et al. . |
| 4,771,621 | 9/1988 | Sato . |
| 4,789,440 | 12/1988 | Mahr et al. . |

Primary Examiner—P. W. Echols
Assistant Examiner—David P. Bryant
Attorney, Agent, or Firm—Samuelson & Jacob

[57] ABSTRACT

Method and apparatus for manufacturing formed, plated component parts in a continuous production run which includes component parts of alternate configurations by advancing a strip of material of indeterminate length, within which strip the component parts are carried, through a plating operation continuously while the forming operation is modified to accommodate the alternate configurations without interrupting the continuity of the plating operation so as to enable relatively long uninterrupted production runs which include, within the longer runs, shorter runs of each of the alternate configurations. In addition, the formed and plated component parts are severed from the strip by a severing operation which is modified to accommodate the alternate configurations to deliver individual formed, plated component parts.

9 Claims, 7 Drawing Sheets

CONTINUOUS MANUFACTURE OF FORMED, PLATED COMPONENT PARTS HAVING SELECTED ALTERNATE CONFIGURATIONS

The present invention relates generally to method and apparatus for manufacturing formed, plated parts from a strip of sheet material and pertains, more specifically, to method and apparatus in which formed, plated component parts having alternate configurations are accommodated selectively in a continuous production run utilizing essentially the same method and apparatus without disruption of the plating process.

It is common practice in the manufacture of component parts from metal sheet material to form the parts, as by stamping, in a continuous strip of material and to maintain the partially completed parts in the strip while passing the parts through an electroplating operation, and then to sever the plated parts from the strip so as to deliver completed, individual parts. The nature of the electroplating operation dictates that once established, the plating operation must be carried out continuously, and without interruption, in order to complete a satisfactory production run. Thus, the longer the production run, the more economical it becomes to plate each part manufactured in the run. Accordingly, it has been the practice to manufacture each part in relatively large numbers and to place the manufactured parts in stored inventory for subsequently filling orders for the parts.

In many instances, component parts manufactured by the aforesaid process, while related, have alternate configurations which vary only slightly from one another. Long production runs of each variation results in very large inventories of completed parts. Thus, the manufacturer is faced with the dilemma of having to produce each component part in large numbers in order to attain effective yet economical manufacture, and then having to meet the expense of maintaining a very large inventory of each component part.

For example, in the manufacture of brackets utilized in the computer industry for mounting computer boards within the frame of a computer, the various bracket configurations have portions of common shape and dimensions, but include variations in the arrangement of certain features, such as tabs. The independent manufacture of each variation in a continuous production line reduces the cost of manufacture of a single bracket, but the expense of maintaining large inventories of each variation adds to the cost of each bracket.

The present invention provides method and apparatus which enable the manufacture of formed, plated component parts, such as computer board brackets, in a continuous manner while accommodating various alternate configurations in the manufactured parts, without interrupting the continuity of the plating operation required for effective and economical manufacture of the parts. In this manner, shorter production runs of a particular configuration are made available so as to eliminate the necessity for large inventories of each configuration without sacrificing the economy of longer continuous production runs Thus, the present invention exhibits several objects and advantages, some of which are summarized as follows: Enables the manufacture of varied individual configurations of formed, plated component parts in relatively short production runs without the disruption of relatively long production runs comprised of component parts of individual different configurations; provides for the more economical manufacture and supply of formed, plated component parts in various alternate configurations; allows greater flexibility in making available various configurations in formed, plated component parts in that the penalty imposed by the requirement for relatively large production runs is reduced; renders the manufacturing process more responsive to the immediate demands of the market, with concomitant added flexibility in the production of new designs, while keeping pace with the needs of existing designs; attains consistent high quality in the manufacture of all of the various alternate configurations without excessive expense.

The above objects and advantages, as well as further objects and advantages, are attained by the present invention which may be described briefly as apparatus and method for manufacturing formed, plated component parts in a continuous production run which includes component parts of alternate configurations, the apparatus and method comprising: means for and the step of advancing a continuous strip of material along a predetermined path of travel from a supply of strip material through forming means placed at a forming station located along the path of travel downstream from the supply; means for and the step of forming component parts of a first configuration in the continuous strip of material at the forming station such that the component parts are carried by the continuous strip along the predetermined path of travel; means for and the step of advancing the strip of material, with the formed component parts therein, from the forming station downstream through plating means placed at a plating station located along the predetermined path of travel downstream of the forming station; means for and the step of selectively accumulating a length of the continuous strip, with the component parts therein, between the forming station and the plating station such that advancement of the strip through the plating station is continued from the accumulated length; means for and the step of modifying the forming means at the forming station while the strip is advanced from the accumulated length through the plating station such that advancement of the strip through the plating station is continued while the forming means is modified for forming component parts of a second configuration; and means for and the step of subsequently forming component parts of the second configuration in the continuous strip of material at the forming station such that the component parts are carried by the continuous strip along the predetermined path of travel through the plating station. In addition, the invention contemplates means for and the step of subsequently severing the formed and plated component parts from the continuous strip to provide individual completed formed, plated component parts.

The invention will be understood more fully, while still further objects and advantages will become apparent, in the following detailed description of preferred embodiments of the invention illustrated in the accompanying drawing, in which.

Figure 1:
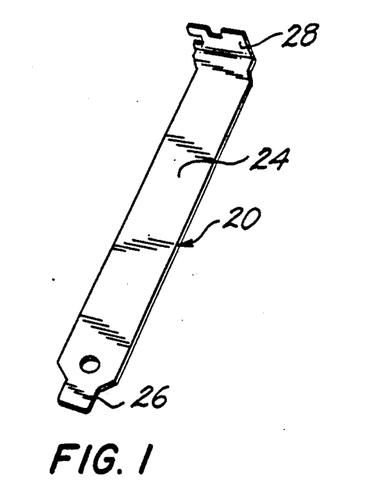
FIG. 1 is a perspective view of a component part manufactured in accordance with the apparatus and method of the present invention.
Figure 2:
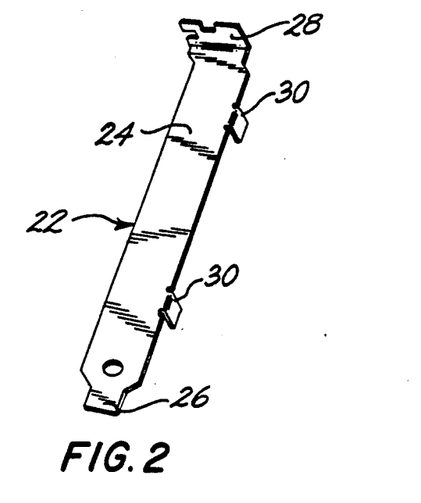
FIG. 2 is a perspective view of another component part manufactured in accordance with the apparatus and method of the present invention.

Referring now to the drawing, and especially to FIGS. 1 and 2 thereof, typical component parts constructed in accordance with the method and apparatus of the present invention are illustrated in the form of a computer board bracket 20, shown in FIG. 1, and an alternate computer board bracket 22, illustrated in FIG. 2. Both brackets 20 and 22 have common portions of the same configuration and dimensions, but differ in certain structural features. Thus, bracket 20, known as a flat bracket, includes a plate 24 having a tongue 26 at one end of the plate 24 and a finger 28 at the other end. Bracket 22, known as a tabbed bracket, includes the same plate 24, tongue 26 and finger 28, but also has a pair of tabs 30 extending from the plate 24, intermediate the ends of the plate 24. The brackets 20 and 22 are manufactured from a sheet of metal by stamping each bracket from a flat sheet of material and then plating the formed bracket to complete a formed and plated component part. One of the more economical procedures for accomplishing the forming and plating operations is to form the component parts in a strip of material of indeterminate length in such a way that the component parts are carried by the strip itself, and then pass the strip, with the component parts carried in the strip, through an electroplating bath to accomplish the plating operation. Subsequently, the component parts are severed from the strip to complete individual component parts. Such a procedure enables the continuous production of component parts in relatively large numbers at minimal cost.

A critical aspect of the procedure is the establishment and maintenance of an effective and stable electroplating operation for plating the component parts as the component parts are carried continuously through the plating bath. Because a finite amount of time is required upon start-up to establish an effective plating operation, the procedure is most economical only when the continuity of the plating operation, once established, remains undisturbed. Accordingly, in order to minimize the cost of manufacture of each individual component part, it has been the practice to manufacture a relatively large number of component parts in any particular production run. Where there are many alternative structural features in the component parts, leading to many structural variations in the component parts, the necessity for long production runs has meant that large numbers of each variation of component parts are produced, requiring storage in inventory of relatively large numbers of different component parts so as to have available, on demand, a supply of any one of the component parts. In order to reduce the expense involved in having to maintain a relatively large inventory of the many variations of formed and plated component parts, such as computer board brackets, the present invention takes advantage of the common configuration and dimensions of portions of the component parts to incorporate component parts of alternate construction in a single production run so that the production run can be continued for as long as is necessary to obtain economical manufacture while at the same time producing different variants in the same production run so as to reduce the inventory of each different variant of the completed component parts. In this manner, the manufacturer remains responsive to the needs of the market in terms of being able to provide timely delivery of orders for quantities of the various configurations, without the necessity for maintaining a large inventory of every variant.

Figure 3:
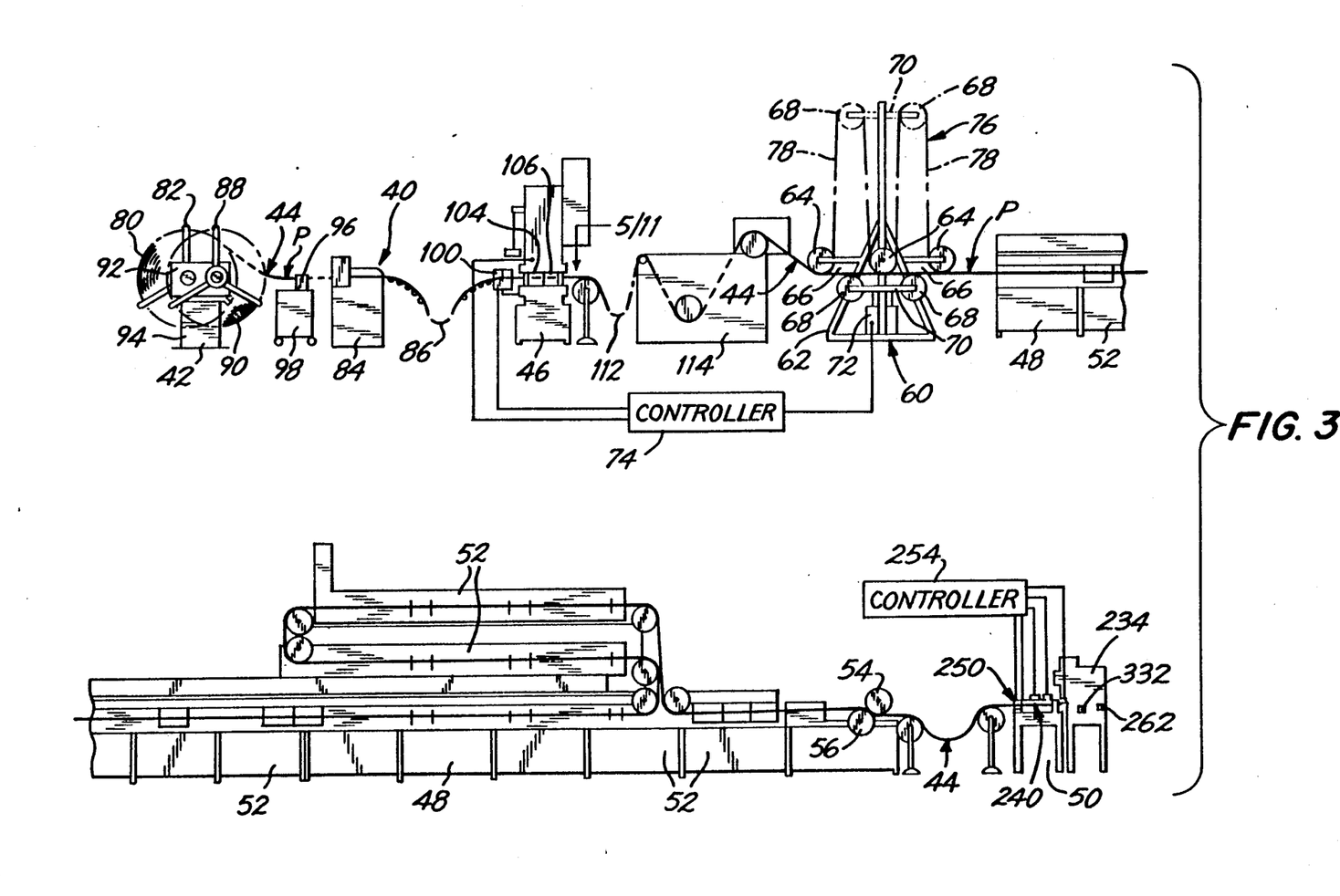
FIG. 3 is somewhat diagrammatic elevational view of an apparatus constructed in accordance with the invention and illustrating the method of the invention.
Figure 4:
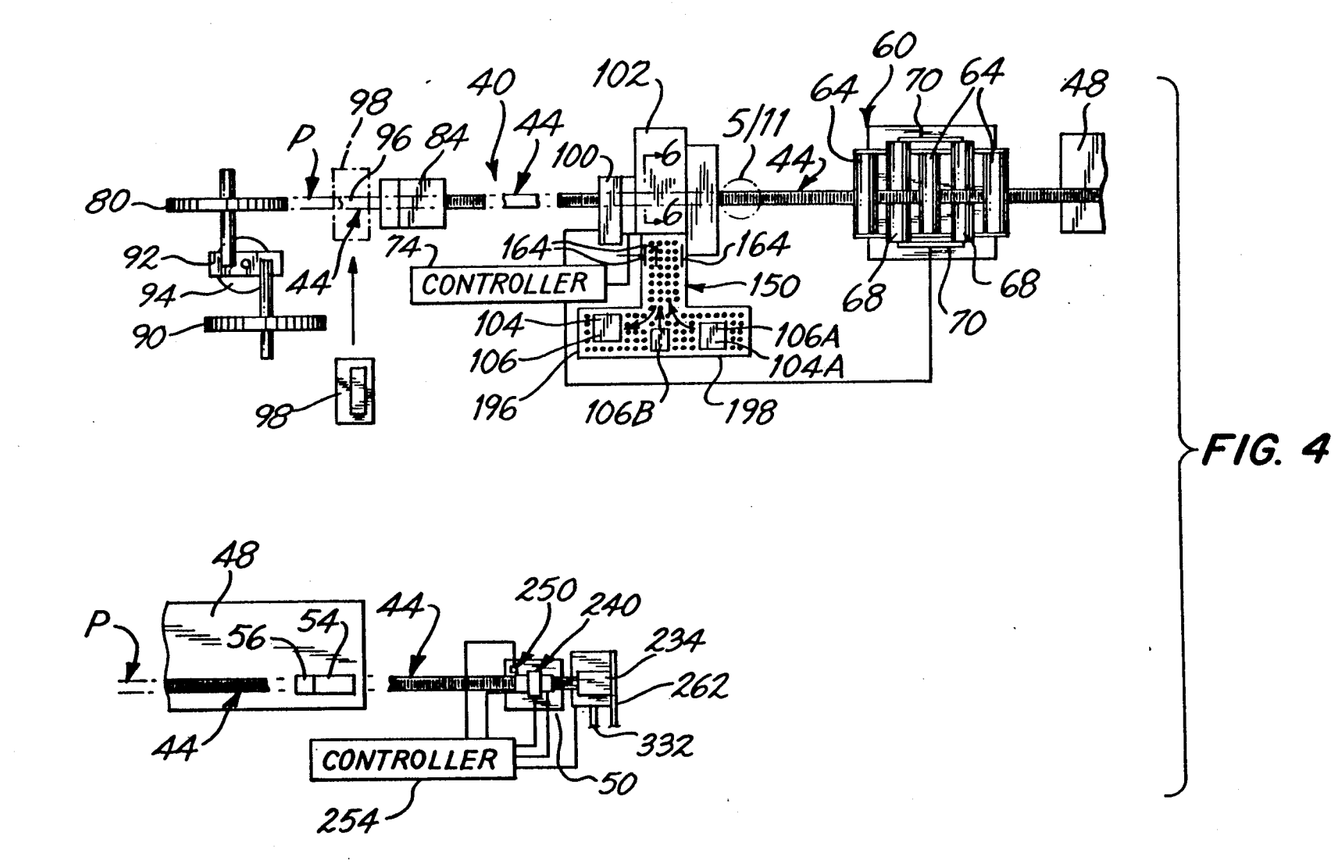
FIG. 4 is a fragmentary plan view of portions of FIG. 3.

Turning now to FIGS. 3 and 4, a production line utilizing the method and apparatus of the present invention is illustrated generally at 40 and is seen to include a supply station 42 for supplying material in the form of a strip 44 of indeterminate length along a prescribed path of travel P extending longitudinally along the production line 40 to a forming station 46, placed downstream of the supply station 42, where the component parts in the form of brackets 20 or 22 are formed in the strip 44, and then advanced downstream along the path of travel P to a plating station 48. Once plated, the brackets 20 or 22 are carried by the strip 44 to a severing station 50 where the brackets 20 or 22 are severed from the strip 44 to deliver completed individual brackets 20 or 22.

The plating station 48 includes a series of electroplating baths 52 the operation of which are quite critical to obtaining proper plating of the continuously moving brackets 20 or 22 carried by the strip 44. Accordingly, once the appropriate plating operation is established, it is essential to economical production that advancement of the strip 44, with the brackets 20 or 22 carried by the strip 44, be continued at a prescribed rate of advancement without interruption. Such advancement of the strip 44 through the plating station 48 is accomplished by passing the strip 44 between a driven capstan 54 and a pinch roller 56. In order to assure a continuous advancement of material through the plating station 48 and thereby attain manufacturing economy through an extended production run, certain operating features are present. Thus, an accumulator 60 is placed between the forming station 46 and the plating station 48 and includes a fixed frame 62 carrying three first rollers 64 which extend laterally across the path of travel P, and across the strip 44, altitudinally above the path of travel P, and are spaced apart longitudinally to establish gaps 66. A pair of second rollers 68 are carried by a carriage 70 coupled to an actuator 72 for movement in altitudinally upward and downward directions relative to fixed frame 62 in response to operation of the actuator 72. Second rollers 68 normally are located altitudinally below the path of travel P, as shown in full lines in FIG. 3, so that strip 44, with brackets 20 or 22, passes between the upper first rollers 64 and the lower second rollers 68.

When it becomes necessary to interrupt the continuity of advancement of the strip 44 upstream of the accumulator 60, for reasons which will be set forth in greater detail below, continuity of advancement, at the same rate of advancement, is maintained downstream of the accumulator 60, as follows. Actuator 72 is operated by a controller 74 in advance of any anticipated discontinuity in the advancement of strip 44 upstream of the accumulator 60 to raise the carriage 70 to the elevated position shown in phantom in FIG. 3, thereby establishing an accumulated length 76 of the strip 44, the accumulated length being in the form of loops 78 formed as the second rollers 68 are raised and pass upwardly through the gaps 66 between the first rollers 64. The accumulated length 76 is drawn from upstream of the accumulator 60, as will be explained below, so as not to disturb the continuity of advancement of the strip 44 through the plating station 48. Any discontinuity in the advancement of the strip 44 upstream of the accumulator 60 is not transmitted beyond the accumulator 60 since advancement of the strip 44 downstream of the accumulator 60 is from the accumulated length 76 in loops 78, thereby assuring continuity in the advancement of the strip 44 through the plating station 48 at the rate of advancement established for the plating operation.

Strip 44 is supplied from a supply in the form of a coil 80 of stock strip material of indeterminate length supported on a first reel 82 at the supply station 42. The strip 44 is advanced downstream through a stock straightener 84 to a relatively shallow control loop 86 located between the supply station 42 and the forming station 46. A second reel 88 holds a second coil 90 of stock material in readiness adjacent the path of travel P. Both the first reel 82 and the second reel 88 are carried by a support head 92 mounted for swiveling movement on a post 94 so that upon exhaustion of the supply of strip 44 provided by the first coil 80, the first reel 82 may be moved out of the path of travel P and replaced by the second reel 88, carrying second coil 90. In order to accomplish such replacement, without interruption of the advancement of strip 44 through the plating station 48, controller 74 is activated first to operate the accumulator 60 and establish accumulated length 76 and then to discontinue advancement of the strip 44 upstream of the accumulated length 76 in the accumulator 60. Once second reel 88 is in place for supplying strip material 44, material is drawn from coil 90 to bring the leading end of that material into abutment with the trailing end of the material already in the path of travel P from the first coil 80, which trailing end is located at 96. A butt welding machine 98 is moved into place at 96 and the leading end of the material drawn from coil 90 is welded to the trailing end of the material already in the path of travel P at 96. The replacement of exhausted reel 82 with the full reel 88 is accomplished while the plating station 48 is supplied with continuously advanced strip 44 by virtue of feeding strip 44 from the accumulated length 76 in loops 78 in the accumulator 60 during the time required for the changeover from reel 82 to reel 88.

Figure 5:
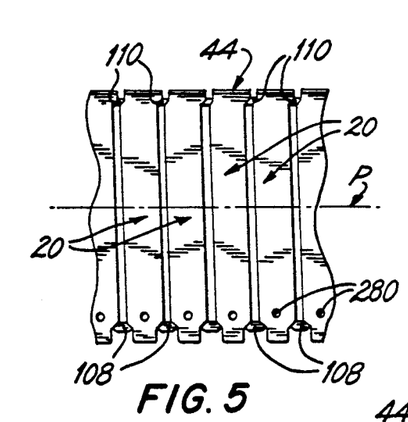
FIG. 5 is an enlarged fragmentary plan view of a portion of the continuous strip of material carrying formed component parts of FIG. 1 during a particular stage of manufacture, as indicated at 5 in FIGS. 3 and 4.

Strip 44 is advanced from the supply station 42 through the relatively shallow control loop 86 to a strip feeder 100 at the forming station 46. Brackets 20 or 22 are formed in the strip 44 at the forming station 46 by forming means in the form of a punch press 102 which carries a pair of punch-and-die sets 104 and 106. As illustrated in FIG. 5, punch-and-die sets 104 and 106 sequentially form brackets 20 such that the brackets 20 are carried in the strip 44 by webs 108 and 110 which maintain the integrity of the strip 44. Upon leaving the punch press 102, the strip 44, with the brackets 20 carried in the strip 44, passes through another relatively shallow control loop 112 and into a cleaning bath 114 prior to continuing downstream toward the plating station 48. Thus, the manufacture of brackets 20 may be continued in a production run of almost any selected length to produce any required number of brackets 20 without disruption of the continuity of the plating operation at the plating station 48.

Figures 6, 7, 9, 10:
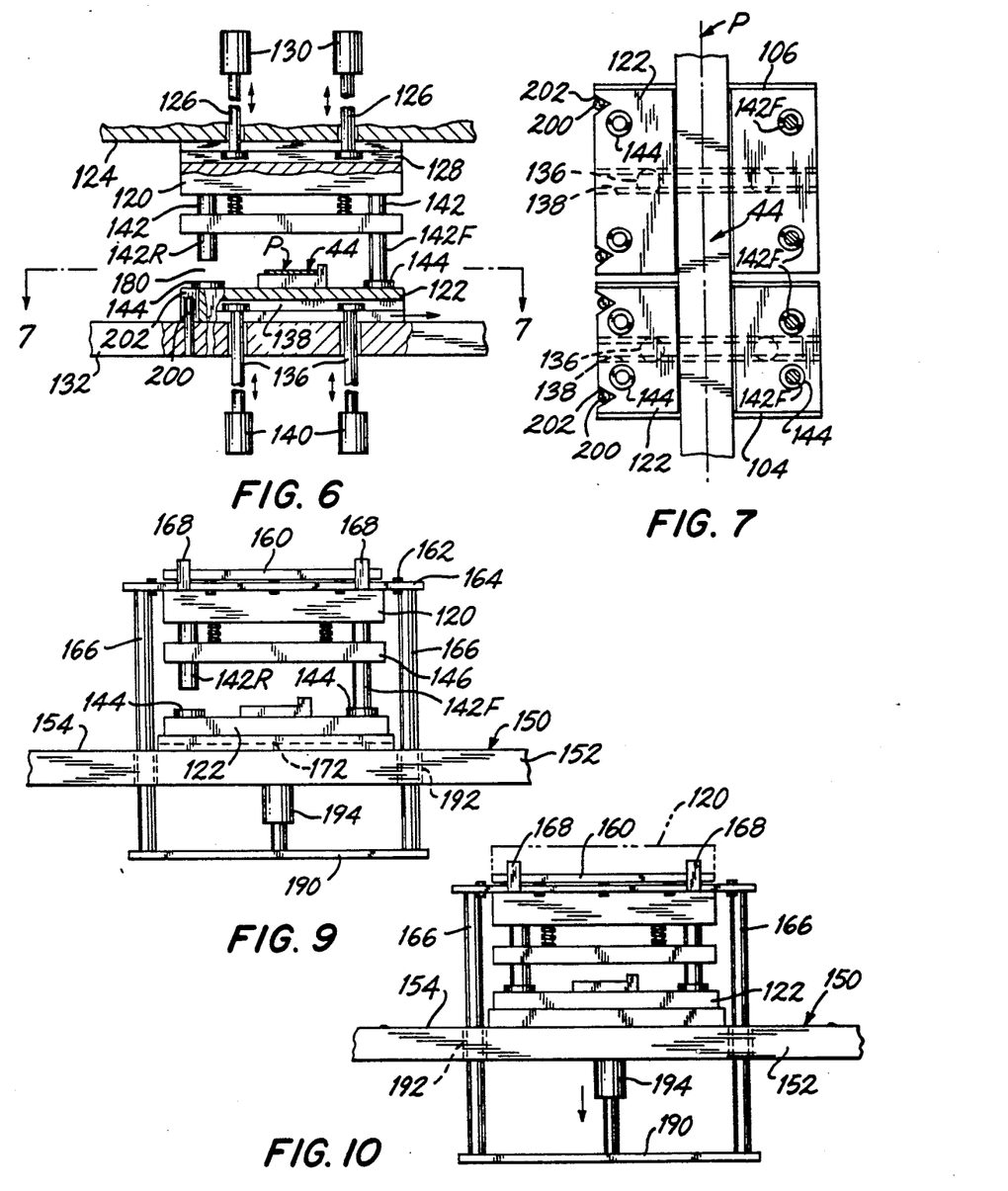
FIG. 6 is an enlarged transverse partially sectioned somewhat diagrammatic elevational view of a portion of the forming station of the apparatus, taken along line 6—6 of FIG. 4.
FIG. 7 is a cross-sectional view taken along line 7—7 of FIG. 6.
FIG. 9 is a somewhat diagrammatic elevational view taken in the direction of the arrow 9 in FIG. 8.
FIG. 10 is a view similar to FIG. 9, with the operating components in another operating position.

When it is desired to discontinue the production of brackets 20 and commence the manufacture of brackets 22, without interrupting the continuity of the plating operation being carried out at the plating station 48, accumulator 60 is operated, by controller 74, to establish accumulated length 76 of strip 44. The accumulated length 76 is drawn from upstream of the accumulator 60 by operating the strip feeder 100, under the control of controller 74, at a rate which will fill the loops 78 of the accumulator 60 without disturbing the rate of advancement of strip 44 downstream of the accumulator 60. Once the accumulated length 76 is in place, the punch press 102 is stopped and punch-and-die sets 104 and 106 are replaced with tooling which will form brackets 22. Referring now to FIGS. 6 and 7, each punch-and-die set 104 and 106 includes a punch 120 and a die 122. Each punch 120 is mounted upon a reciprocating platen 124 of the punch press 102 by means of headed clamping rods 126 which enter corresponding complementary slots 128 in the punch 120 and selectively lock the punch 120 in place on the platen 124 by the actuation of actuators 130 coupled to the headed clamping rods 126, in a well-known manner. In a like manner, each die 122 is secured to a fixed platen 132 of the punch press 102 by means of headed clamping rods 136 which enter corresponding complementary slots 138 in the die 122 and selectively are actuated by actuators 140. The strip 44 is advanced along path of travel P which lies altitudinally between the punches 120 and the dies 122. The punches 120 include depending slides 142 which, upon reciprocation of the punches 120 relative to the dies 122, slide within complementary bushings 144 in the dies 122 to positively guide the punches 120 relative to the dies 122 for engaging the corresponding punches 120 and dies 122 to form brackets 20 in the strip 44. Stripper plates 146 are associated with each punch 120 for stripping the strip 44 from the punches 120, as is conventional in stamping operations. The punch press 102 is stopped with the punch-and-die sets 104 and 106 open, as illustrated.

Figure 8:
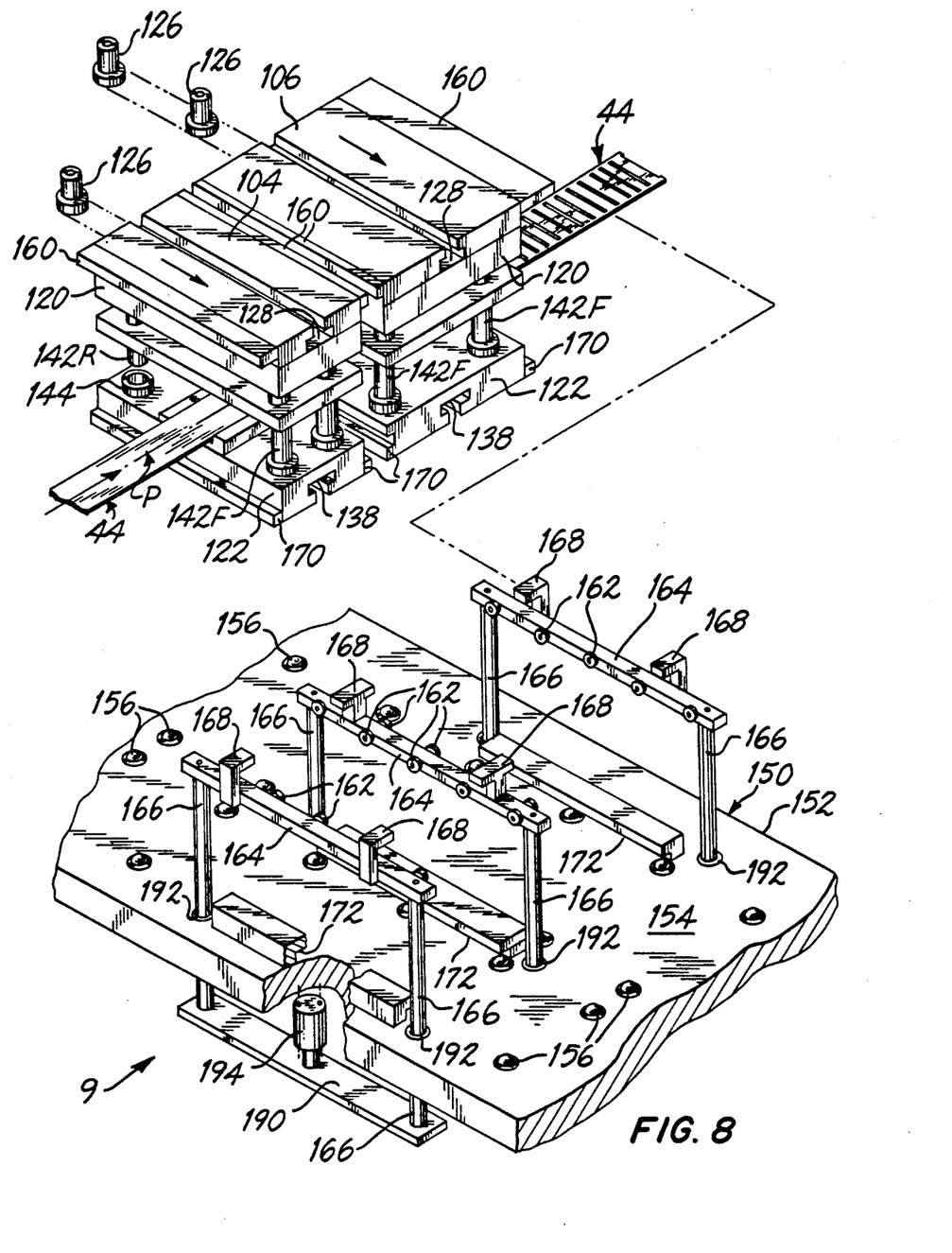
FIG. 8 is an enlarged partially diagrammatic perspective view illustrating the operation of apparatus and method of the invention.

As best seen in FIGS. 8, 9 and 10, replacing means including die-set movement means in the form of a table 150 is placed immediately adjacent the fixed platen 132, the table 150 provides support means including a platform 152 having an upper surface 154 located at the same altitudinal level as the fixed platen 132. Once the punch press 102 is stopped, with the punch-and-die sets 104 and 106 open, the clamping rods 126 and 136 are unclamped and each punch-and-die set 104 and 106 is freed for sliding movement in the lateral direction extending over the table 150, with the headed clamping rods 126 and 136 slidably engaged within the corresponding slots 128 and 138 to guide the lateral movement of the punches 120 and dies 122, the lateral sliding movement being facilitated by ball bearings 156 in the platform 152. As the punch-and-die sets 104 and 106 are moved laterally by manual operation, laterally extending splines 160 affixed to each punch 120 ride onto support rollers 162 carried by support members in the form of support beams 164 supported above the altitudinally opposite support member provided by platform 152 of the table 150 by corresponding support posts 166 and pass beneath hold-downs 168 affixed to the support beams 164. At the same time, laterally extending keys 170 affixed to each die 122 enter corresponding guide channels 172 located immediately above the upper surface 154 of the platform 152. It is noted that while the front depending slides 142F remain engaged with the corresponding bushings 144, the rear depending slides 142R are spaced upwardly from the corresponding bushings 144 to provide a clearance 180 for strip 44 so that strip 44 remains in place along the path of travel P as the punch-and-die sets 104 and 106 are moved laterally out of the punch press 102.

Figure 11:
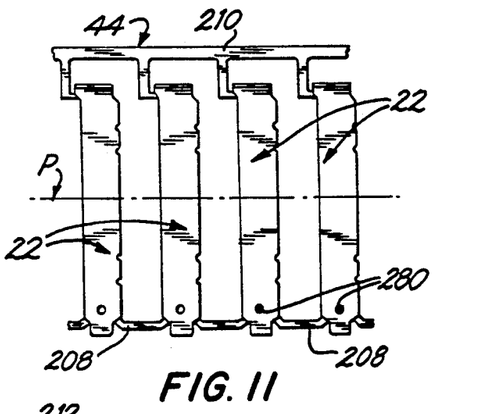
FIG. 11 is an enlarged fragmentary plan view of a portion of the continuous strip of material carrying formed component parts of FIG. 2 during a particular stage of manufacture indicated at 11 in FIGS. 3 and 4.

Support posts 166 are carried by a yoke 190 located beneath the platform 152 of the table 150 and are mounted for sliding movement in altitudinal directions by means of table bushings 192 in the platform 152 of the table 150. An actuator in the form of an air cylinder 194 couples each yoke 190 to the platform 152 of the table 150. When the punch-and-die sets 104 and 106 are fully disengaged from the punch press 102 and rest fully upon the table 150, as seen in FIG. 9, The air cylinders 194 are actuated to lower the support beams 164 and close the punch-and-die sets 104 and 106, as illustrated in FIG. 10. Once closed, the punch-and-die sets 104 and 106 are moved away from the punch press 102, here illustrated by manual movement of the punch-and-die sets 104 and 106 along a first extension 196 of platform 152, as seen in FIG. 4, and alternate punch-and-die sets 104A and 106A, previously placed upon a second extension 198 of the platform 152, are moved manually into place and inserted into the punch press 102 by merely reversing the above procedure; that is, the alternate punch-and-die sets 104A and 106A which previously had been placed upon the second extension 198 of platform 152 of table 150, as shown in FIG. 4, are located on the platform 152, adjacent the open upper and lower platens 124 and 132, and the air cylinders 194 are actuated to open the alternate punch-and-die sets 104A and 106A. The alternate punch-and-die sets 104A and 106A then are moved manually laterally into place between the upper and lower platens 124 and 132, with the headed clamping rods 126 and 136 entering and slidably engaging the corresponding slots 128 and 138 in the punch-and-die sets 104A and 106A. Insertion and location of the alternate punch-and-die sets 104A and 106A is facilitated by cylindrical stops 200 provided at the rear of the lower platen 132, which stops 200 engage counterpart V-shaped notches 202 in the punch-and-die sets 104, 106 and 104A, 106A to assure that each punch-and-die set 104, 104A and 106, 106A is properly located in the punch press 102 with ease and rapidity. Since the punch-and-die sets 104 and 106 and the alternate punch-and-die sets 104A and 106A all are transferred from and to the punch press 102 while held in the open position of the respective punch-and-die sets 104, 106, 104A and 106A, the strip 44 remains in place along the path of travel P and is undisturbed by the change of punch-and-die sets. The headed clamping rods 126 and 136 then are clamped to secure the punch-and-die sets 104A and 106A in place and the punch press 102 is operated to commence forming the brackets 22, which emerge from the punch press 102 carried by the same strip 44, as illustrated in FIG. 11. The entire modifying operation described above, in which the punch press 102 is modified by replacing the punch-and-die sets 104 and 106 with alternate punch-and-die sets 104A and 106A, utilizing the modifying and replacing means described above, is accomplished quickly, and with a limited number of simple steps, so as to complete the modification while the plating operation is continued without interruption, using the accumulated length 76 of strip 44 while the modification is in progress. Once the alternate punch-and-die sets 104A and 106A are in place in the punch press 102, the advancement of strip 44 is continued, with the alternate brackets 22 now formed in the strip 44 and carried within the strip 44 by webs 208 and 210, all as illustrated in FIG. 11.

Figure 12:
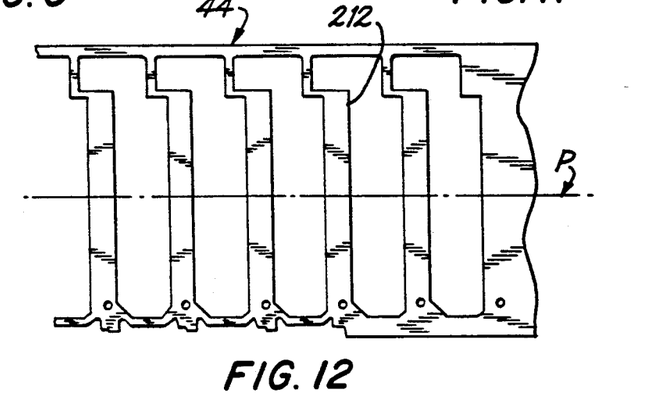
FIG. 12 is an enlarged fragmentary plan view of the continuous strip of material, prepared with an intermediate configuration.
Figure 13:
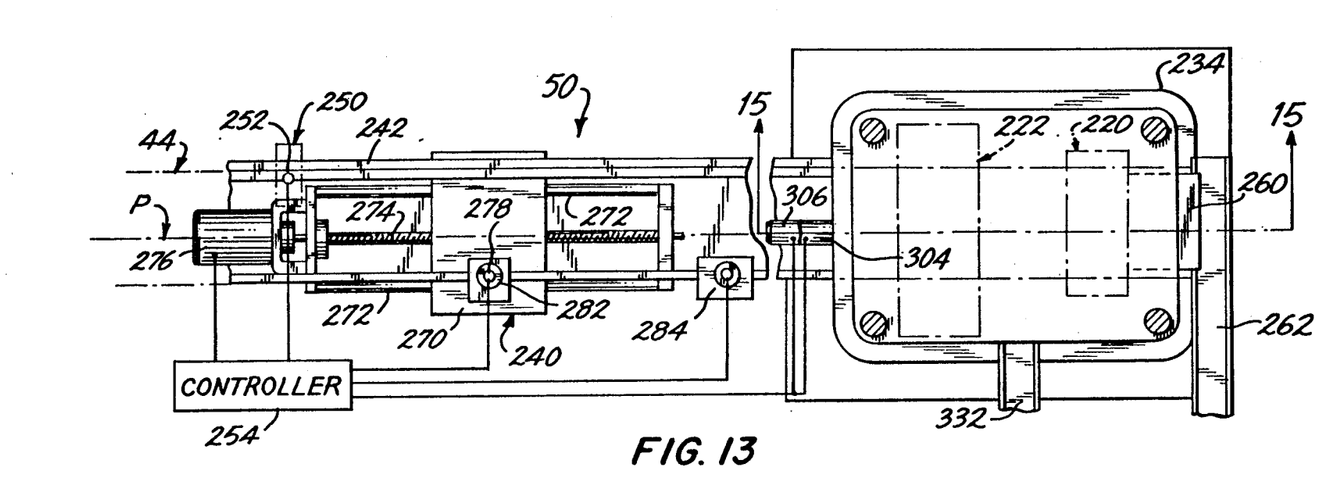
FIG. 13 is a somewhat diagrammatic plan view of a portion of the apparatus adjacent the severing station thereof.
Figure 14:
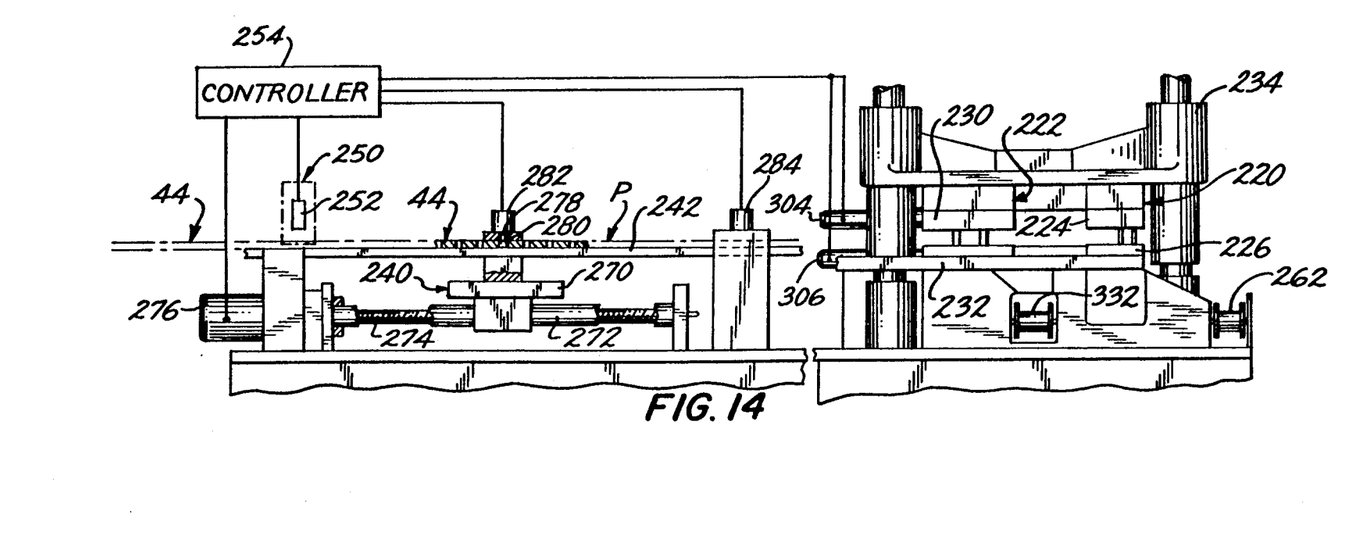
FIG. 14 is a somewhat diagrammatic elevational view of the portion of the apparatus shown in FIG. 13.

In some instances, it may be necessary to prepare the strip 44 for the manufacture of brackets 22 after having produced brackets 20, depending upon the difference in the configurations present in the brackets 20 and 22. In such an instance, a preparation punch-and-die set 106B, shown in FIG. 4, is inserted into the punch press 102 after punch-and-die set 106 is removed and before punch-and-die set 106A is inserted. The punch press 102 is then operated through a few cycles to prepare strip 44, as illustrated by the intermediate configuration 212 of strip 44 shown in FIG. 12, for the changeover from the forming of brackets 20 to the forming of brackets 22. Then, punch-and-die set 106B is removed and punch-and-die sets 104A and 106a are placed in punch press 102 for the manufacture of brackets 22.

Turning now to FIGS. 13 through 16, as well as to FIGS. 3 and 4, severing station 50 is seen to include severing means in the form of alternate cut-off punch-and-die sets 220 and 222 located in the severing station 50 and placed relative to path of travel P to sever each bracket 20 or 22 from the strip 44 in order to deliver individual completed formed and plated brackets 20 and 22. Punch-and-die set 220 includes punches 224 and dies 226 having a configuration corresponding to the webs 108 and 110 which carry the brackets 20 within the strip 44, while punch-and-die set 222 includes punches 230 and dies 232 having a configuration corresponding to the webs 208 and 210 which carry the brackets 22 within the strip 44. Punch-and-die set 222 is located upstream of punch-and-die set 220, along the path of travel P, and both punch-and-die sets 220 and 222 are placed in a punch press 234 located in the severing station 50 for operation in a conventional manner. A strip feeder 240 is located just upstream of the punch-and-die sets 220 and 222 and feeds the strip 44 along a track 242 leading to the punch-and-die sets 220 and 22 and through the severing station 50 in predetermined fixed increments, as will be explained in greater detail below.

A detecting station 250 is located within the severing station 50, just upstream of the strip feeder 240 thereof, along the path of travel P, and includes a detector 252, preferably in the form of a photoelectric sensor, so located as to detect the presence or absence of webs 210 in strip 44 as the strip 44 advances along the path of travel P through the detecting station 250. As set forth above, brackets 20 are maintained in strip 44 by webs 108 and 110, and brackets 22 are maintained in strip 44 by webs 208 and 210. A comparison of the strip 44 as illustrated in each of FIGS. 5 and 11 reveals that webs 110 are spaced laterally away from webs 210 such that as strip 44 traverses the detecting station 250, any webs 210 will pass directly beneath detector 252, while any webs 110 will be spaced laterally away from detector 252. During the manufacture of brackets 20, no webs 210 are present in strip 44 as the strip 44 passes through the detecting station 250. Detector 252 signals a controller 254 affirming that webs 210 are not present and the controller 254 operates strip feeder 240 to feed strip 44 in increments corresponding to the dimensions of the brackets 20 so that webs corresponding to the dimensions of the brackets 20 so that webs 108 and 110 are registered accurately within corresponding punch-and-die set 220 in synchronism with the operation of the punch press 234 to effect severing of the webs 108 and 110 and the brackets 20 from the strip 44 The individual brackets 20, thus severed from strip 44, drop into a first chute 260 and are delivered to a first collection conveyor 262.

Strip feeder 240 includes a carriage 270 mounted for reciprocating movement along fixed rails 272 and coupled for movement by a lead screw 274 which is rotated by a motor 276 in predetermined angular increments of rotation, in opposite directions, to reciprocate the carriage 270 through a longitudinal feed stroke corresponding to the longitudinal increment of advancement necessary to place each bracket 20 in appropriate registration within the severing station 50. Strip 44 is coupled to carriage 270 by a finger 278 on the carriage 270, which finger 278 is moved into a pilot hole 280 in the strip 44 (see FIGS, 5 and 11) by an actuator 282, under the control of controller 254, during the downstream stroke of the carriage 270 to positively engage and advance the strip 44 through the longitudinal increment of advancement. Upon the return stroke of the carriage 270, the finger 278 is retracted from the pilot hole 280, by the actuator 282, while a clamp 284 is activated, again by controller 254, to grip the strip 44 and maintain the strip 44 stationary until the carriage 270 is fully retracted.

Figures 15, 16:
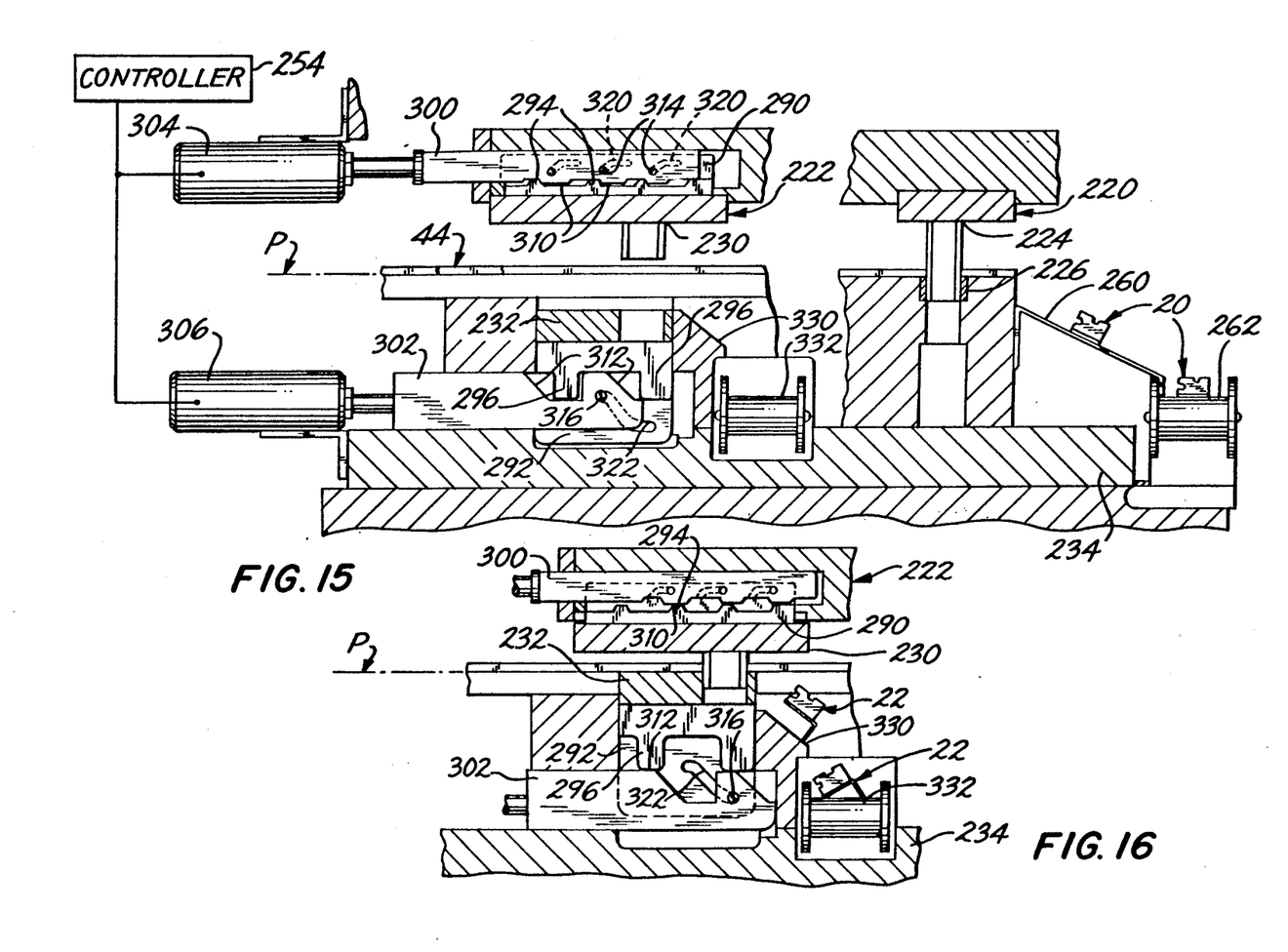
FIG. 15 is a cross-sectional view taken along line 15—15 of FIG. 13.
FIG. 16 is a cross-sectional view similar to FIG. 15, with the operating components in another operating position.

As best seen in FIGS. 15 and 16, while the brackets 20 are being severed from the strip 44 by punch-and-die set 220, the second punch-and-die set 222 is disabled so that upon operation of punch press 234 to effect relative reciprocation of punches 224 and dies 226 of punch-and-die set 220, and the consequent severing of webs 108 and 110 and brackets 20 from strip 44, the punches 230 and dies 232 of punch-and-die set 222 do not operate on strip 44 and do not interfere with the free advancement of strip 44 with brackets 20 therein along path of travel P between punches 230 and dies 232 to punch-and-die set 220. To that end, the punches 230 and dies 232 of punch-and-die set 222 are carried by respective blocks 290 and 292, each of which blocks 290 and 292 is mounted for sliding movement in altitudinal directions, normal to path of travel P, within the punch-and-die set 222. The blocks 290 and 292 include respective followers 294 and 296 which engage corresponding slides 300 and 302, and each slide 300 and 302 is coupled with a corresponding actuator 304 and 306 for movement of the slides 300 and 302 between an inactive, or passive position, as illustrated in FIG. 15, where the punches 230 and the dies 232 are retracted relative to one another, and relative to path of travel P, and therefore are reciprocated through a passive stroke during which passive stroke the punches 230 and the dies 232 cannot reach the strip 44 for a severing action, or for interfering with the advancement of the strip 44, with the brackets 20 therein, to the punch-and-die set 220, and an active position, as illustrated in FIG. 16, where the punches 230 and the dies 232 are in position to interact with one another in a fully active or severing stroke Thus, slides 300 and 302 include respective cams 310 and 312 which engage the corresponding followers 294 and 296 as the slides 300 and 303 are moved longitudinally by the respective actuators 304 and 306. Slides 300 and 302 also carry respective pins 314 and 316 which are engaged in corresponding slots 320 and 322 in the blocks 290 and 292 so that upon longitudinal movement of the slides 300 and 302, the cams 310 and 312 are urged against the followers 294 and 296 and the pins 314 and 316 ride in the slots 320 and 322 to move the blocks 290 and 292, together with the punches 230 and the dies 232 carried by the blocks 290 and 292, in directions normal to the path of travel P between the passive position shown in FIG. 15 and the active position shown in FIG. 16. Thus, as long as detector 252 affirms that no web 210 is present in strip 44 as the strip 44 enters the severing station 50, controller 254 maintains actuators 304 and 306, and the slides 300 and 302 coupled to the actuators 304 and 306, in position to maintain the punch-and-die set 222 in the passive position, so that strip 44 can proceed to punch-and-die set 220 for the severing of brackets 20 from the strip 44, as aforesaid.

During manufacture of brackets 22, detector 252 detects the presence of webs 210 at the detecting station 250 and controller 254 is signalled accordingly. Controller 254 then operates motor 276 to rotate the lead screw 274 through increments of angular rotation corresponding to the increments of advancement of strip punch-and-die set 222 so that upon operation of punch press 234 to effect relative reciprocation of punches 230 and dies 232 of punch-and-die set 222, webs 208 and 210 and brackets 22 are severed from strip 44 To that end, the slides 300 and 302 are moved by the corresponding actuators 304 and 306, under control of the controller 254, to move the punches 230 and the dies 232 of punch-and-die set 222 to the active position, as illustrated in FIG. 15, where the punches 230 and dies 232 are in position to interact with one another in a fully active severing stroke In this manner, the controller 254, actuators 304 and 306 and slides 300 and 302 serve as modifying means which act as activating/deactivating means for activating and deactivating at least the punch-and-die set 222 in response to the detector 250 so as to modify the severing means at the severing station 50 to accommodate the severing of the particular bracket 20 or 22 placed at the severing station 50. Upon severing brackets 22 from the strip 44, the completed individual brackets 22 are delivered through a second chute 330, upstream of the first chute 260, to a further collection conveyor 332 Since the severing of brackets 22 is accomplished upstream of the punch-and-die set 220, punch-and-die set 220 may remain active during the manufacture of brackets 22; however, wear and any tendency toward other damage of the punch-and-die set 220 may be reduced by incorporating a similar arrangement for displacing at least either one of the punches 224 and dies 226 of punch-and-die set 220 to an inactive, or passive position, during the manufacture of brackets 22, in a manner similar to the above-described displacement of punches 230 and dies 232 of punch-and-die set 222 to an inactive, or passive position. It is pointed out that since strip 44 does not proceed downstream beyond punch-and-die set 222 during the manufacture of brackets 22, there is no need to retract both the punches 224 and the dies 226 of punch-and-die set 220 away from the path of travel P, but it is desirable to retract at least the punches 224 or the dies 226 in order to preclude interaction between the punches 224 and the dies 226 when brackets 20 are not being severed from strip 44.

It will be seen that the method and apparatus of the present invention enables the delivery of formed and plated brackets 20 or 22 in a continuous manner so that a relatively long production run of both brackets can remain continuous while the bracket configurations are varied to allow for the production of a lesser number of brackets of each configuration within the greater number in the production run. In this manner, the manufacturer can respond to an order for a specified number of a particular bracket 20 or 22 by modifying the apparatus while the process remains uninterrupted so that even though the specified number is less than that which could be manufactured economically in a single production run, that specified number becomes a part of a longer, continuous production run in which the total number of brackets does amount to a production run large enough to be accomplished economically. Thus, the need for storing large inventories of different brackets is alleviated, with a concomitant reduction in cost.

Hence, the present invention accomplishes the objects and advantages summarized above; namely: Enables the manufacture of varied individual configurations of formed, plated component parts in relatively short production runs without the disruption of relatively long production runs comprised of component parts of individual different configurations; provides for the more economical manufacture and supply of formed, plated component parts in various alternate configurations; allows greater flexibility in making available various configurations in formed, plated component parts in that the penalty imposed by the requirement for relatively large production runs is reduced; renders the manufacturing process more responsive to the immediate demands of the market, with concomitant added flexibility in the production of new designs, while keeping pace with the needs of existing designs; attains consistent high quality in the manufacture of all of the various alternate configurations without excessive expense.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows 1. The method of manufacturing formed, plated component parts in a continuous production run which includes component parts of alternate configurations, the method comprising:

advancing a continuous strip of material along a predetermined path of travel from a supply of strip material through forming means placed at a forming station located along the path of travel downstream from the supply;

forming component parts of a first configuration in the continuous strip of material at the forming station such that the component parts are carried by the continuous strip along the predetermined path of travel;

advancing the strip of material, with the formed component parts therein, from the forming station downstream through plating means placed at a plating station located along the predetermined path of travel downstream of the forming station;

selectively accumulating a length of the continuous strip, with the component parts therein, between the forming station and the plating station such that advancement of the strip through the plating station is continued from the accumulated length;

modifying the forming means at the forming station while the strip is advanced from the accumulated length through the plating station such that advancement of the strip through the plating station is continued while the forming means is modified for forming component parts of a second configuration; and subsequently forming component parts of the second configuration in the continuous strip of material at the forming station such that the component parts are carried by the continuous strip along the predetermined path of travel through the plating station 2. The invention of claim 1 wherein advancement of the strip of material through the forming station is discontinued while the forming means is modified 3. The invention of claim 1 wherein the strip of material is advanced at a first rate of advancement through the forming station and at a second rate of advancement through the plating station, during accumulation of the accumulated length of the strip of material, the first rate of advancement of the strip of material being greater than the second rate of advancement during accumulation of the accumulated length of the strip material 4. The invention of claim 1 including advancing the strip of material, with the component parts therein, from the plating station to severing means placed at a severing station located along the predetermined path of travel downstream of the plating station, and severing the component parts from the strip to provide individual formed and plated component parts 5. The invention of claim 4 including detecting the configuration of the component parts in the strip of material prior to severing the component parts from the strip to identify which of the first and second configurations is present in the component parts advanced to the severing station, and modifying the severing means to accommodate the configuration of the component parts advanced to the severing means 6. The invention of claim 5 wherein the detecting of the configuration of the component parts in the strip of material is accomplished by detection at a detecting station located along the predetermined path of travel between the plating station and the severing station 7. The invention of claim 1 wherein the forming means includes a punch-and-die set and the step of modifying the forming means includes replacing the punch-and-die set with an alternate punch-and-die set.

8. The invention of claim 7 wherein the predetermined path of travel extends longitudinally through the forming station and through the punch-and-die set, and the step of replacing the punch-and-die set includes moving the punch-and-die set laterally out of the path of travel and moving the alternate punch-and-die set laterally into the path of travel.

9. The invention of claim 1 wherein the forming means includes a punch-and-die set and the step of modifying the forming means includes replacing the punch-and-die set with an intermediate punch-and-die set and then replacing the intermediate punch-and-die set with an alternate punch-and-die set.

* * * * *